(No Model.)

J. SEABROOKS.
FILTER.

No. 421,521. Patented Feb. 18, 1890.

Witnesses:
Jno. G. Hinkel Jr.
A. E. J. Fansmann.

Inventor
Jacob Seabrooks,
By his Attorneys
Foster & Freeman

UNITED STATES PATENT OFFICE.

JACOB SEABROOKS, OF BEAVER FALLS, PENNSYLVANIA.

FILTER.

SPECIFICATION forming part of Letters Patent No. 421,521, dated February 18, 1890.

Application filed May 2, 1889. Serial No. 309,372. (No model.)

*To all whom it may concern:*

Be it known that I, JACOB SEABROOKS, a citizen of the United States, residing at Beaver Falls, in the county of Beaver and State of Pennsylvania, have invented certain new and useful Improvements in Filters, of which the following is a specification.

My invention is an improvement in filters specially adapted for filtering lubricating-oil which has been used, although it may with equal facility be employed for filtering various other kinds of oils and fluids; and my invention consists in the construction, hereinafter fully set forth, whereby I am enabled to effectually and expeditiously remove all impurities from the fluid at a very small cost.

Figure 1:
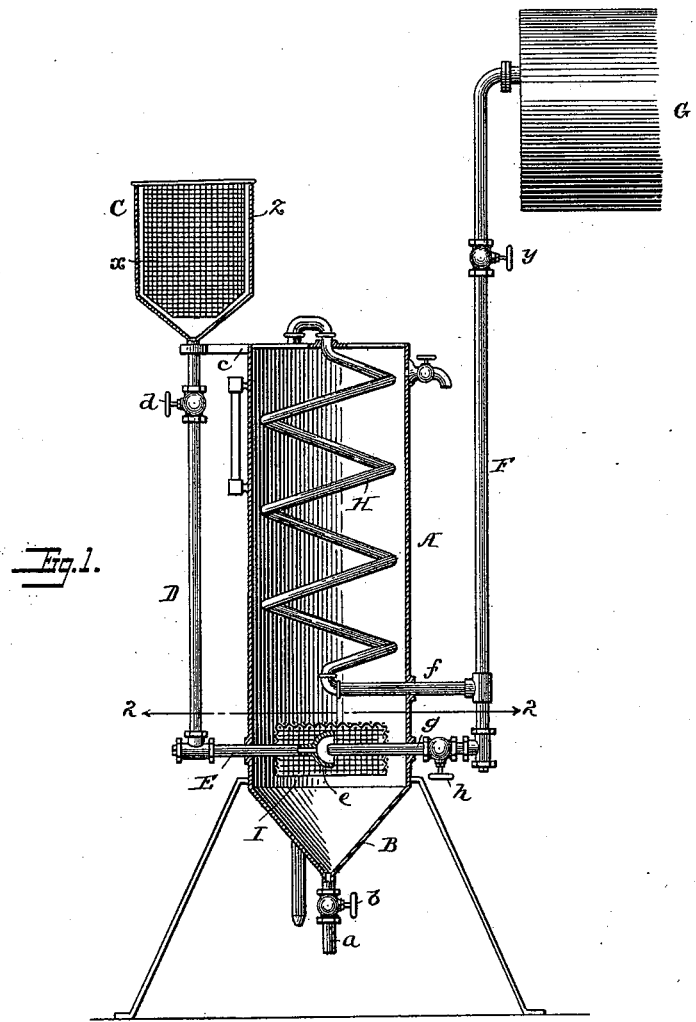
Figure 2:
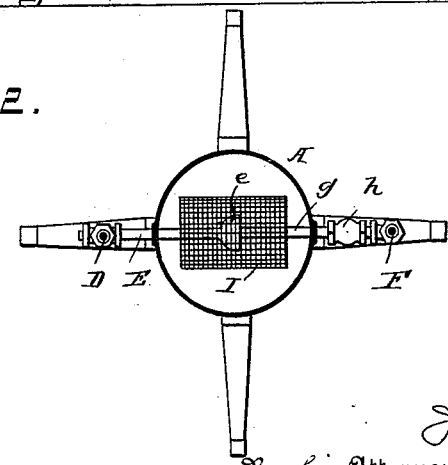

In the drawings, Figure 1 is a vertical central section of a filter embodying my invention. Fig. 2 is a horizontal section on the line 2 2 of Fig. 1.

A is a large cylindrical or other shaped vessel mounted upon suitable legs and provided with a funnel-shaped bottom B, terminating in a discharge-tube $a$, having a valve or stop-cock $b$. At the upper end of the vessel A, and projecting laterally therefrom, is an arm $c$, supporting a receiving-vessel C, having a chamber $z$, within which is arranged a wire-gauze or other sieve $x$, and from the bottom of the chamber extends a vertical pipe D, having a stop-cock $d$. The pipe $d$ communicates at its lower end with a horizontal pipe E, passing through the side of the vessel A, and terminating centrally therein in a bell-shaped mouth-piece $e$.

A second vertical pipe F, having a stop-cock $y$, and communicating at one end with a suitable source of steam-supply—as, for instance, the steam-space of a boiler G—is preferably arranged on the opposite side of the vessel A from the pipe D, and communicates at its lower extremity with two lateral branch pipes $f$ $g$, placed one above the other, and both projecting into the main vessel, as shown. The lower branch pipe $g$ has a stop-cock $h$, and terminates at its inner end centrally within the enlarged mouth $e$ of the pipe E, while the upper branch pipe $f$ communicates with a large steam-coil H, suitably supported within the vessel A. From the upper end of the coil the steam preferably passes downward through a pipe on the outside of the filter, from the lower end of which pipe it escapes through a contracted opening, or it may be returned to the boiler with the feed-water in any convenient manner.

A semi-cylindrical screen I, open on its under side and having closed ends, is preferably supported by and partly incloses the adjacent ends of the horizontal pipes E $g$ within the vessel A, and on the outside of said vessel, near its upper end and communicating with the interior thereof, is placed a transparent gage-tube, as usual.

From the foregoing description the operation of my improved oil-filter will be apparent. The body A of the filter being partly filled with water, the stop-cock $y$ is opened and steam from the boiler permitted to circulate through the coil H, thus thoroughly heating the water surrounding the latter. The dirty oil to be filtered is preferably fed to the receiving-chamber $z$ in a continuous stream, and upon opening the stop-cock $d$ the oil passes into the filter through the pipe D and its lateral branch, the larger particles of foreign matter fed in with the oil being caught and retained within the receiving-chamber by the sieve $x$. The stop-cock $h$ in the line of the branch $g$ leading from the steam-supply pipe F is now opened and a jet of steam forcibly projected into the oil as it passes from the bell-mouth $e$, thus effectually spraying and separating the oil into small particles, and thereby releasing all foreign matter held in suspension therein. The impurities thus separated from the oil by the violent action of the steam are prevented in a measure from being thrown upward by the screen I, and then gravitate to the bottom of the filter, from which they may be removed through the discharge-tube as occasion requires. As the oil rises to the top of the filter it is heated to a comparatively high degree in its passage through the heated water and by contact with the steam-coil, so that any impurities still held in suspension by the oil will be readily liberated therefrom and settle in the bottom of the filter, the oil upon finally reaching the top of the filter being substantially clean and free from all extraneous matter.

It will thus be seen that by the atomizing or separation of the oil into minute particles and its subsequent heating and passage through the body of water it is subjected to a most thorough purifying, washing, and cleaning action, by which it is restored to its natural color and condition.

The filtered oil is drawn from the top of the vessel by a suitable cock, or is otherwise removed.

If a liquid other than oil is to be filtered, it will of course be understood that the water in the vessel A will be replaced by some other liquid of a character which will not combine with the fluid to be filtered.

It will be obvious that the heating-coil may surround the vessel A, if desired, and that the arrangement of the pipes and their connections may be varied without departing from the main features of my invention.

Without limiting myself, therefore, to the precise construction shown, I claim—

1. A filter provided with a vessel containing liquid which will not combine with the liquid to be filtered, an inlet-tube E for the latter liquid, and a second tube arranged to direct a spraying or atomizing jet against the liquid issuing from the tube E and within the body of the filtering medium, substantially as described.

2. A filter provided with a vessel containing a liquid which will not combine with the liquid to be filtered, an inlet-tube E for the latter liquid, a second tube arranged to direct a spraying or atomizing jet against the liquid issuing from the tube E and within the body of the filtering medium, and a heating-coil, substantially as described.

3. In an oil-filter, the combination of the vessel containing water, a heating-coil therein, an oil-supply pipe having an enlarged delivery end, a steam-pipe arranged adjacent thereto, and connections, substantially as described, whereby the oil is atomized on its entry to the filter by a jet of steam, as set forth.

4. In an oil-filter, the combination of the main vessel containing water, a heating-coil therein, an oil-supply pipe having an enlarged delivery end, a steam-pipe adjacent to said end, and cocks and connections for supplying steam to the coil and pipe, substantially as described.

5. In an oil-filter, the combination of the main vessel containing water, a heating-coil within the vessel, an oil-supply pipe with an enlarged delivery end, a steam-pipe projecting into said end, a screen partly inclosing said mouth and pipe, and connections for supplying the oil and steam, substantially as described.

In testimony whereof I have signed my name to this specification in the presence of two subscribing witnesses.

JACOB SEABROOKS.

Witnesses:
J. F. MERRIMAN,
JOHN PALMER.